Dec. 26, 1939.   B. CHANCE   2,185,074
STEERING APPARATUS
Filed Oct. 8, 1937   11 Sheets-Sheet 1
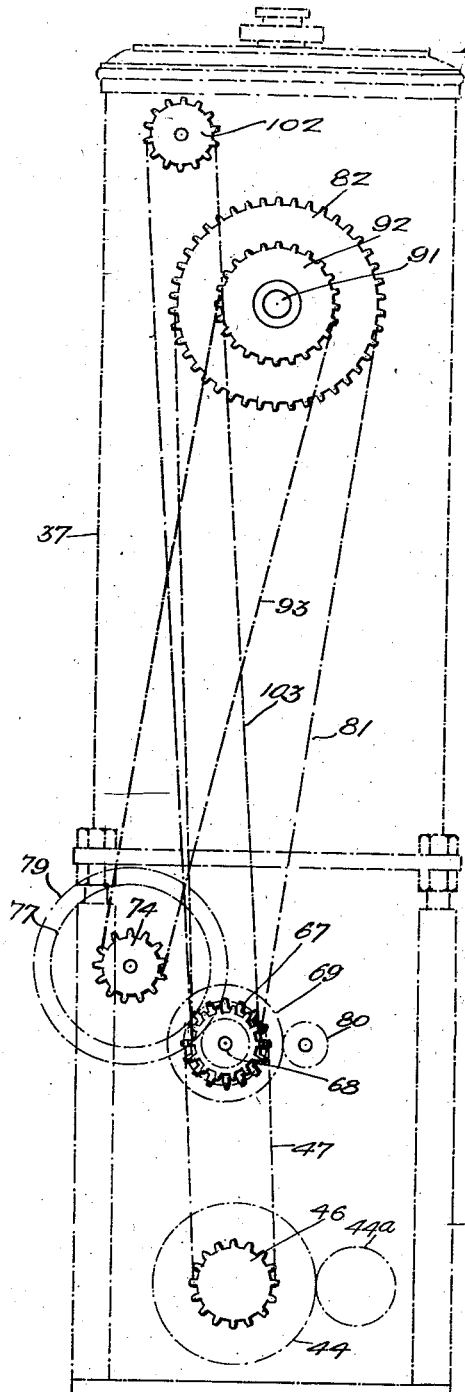
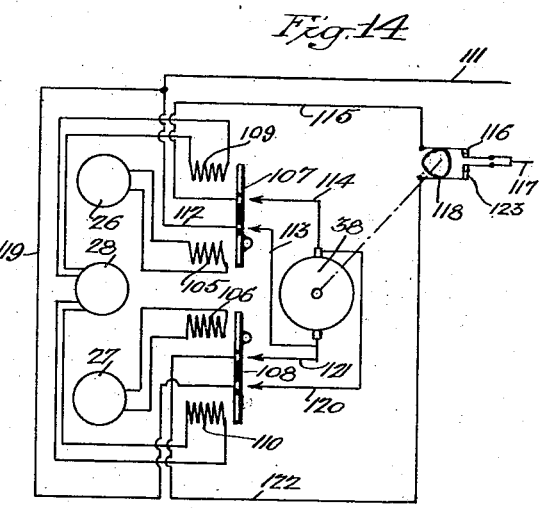
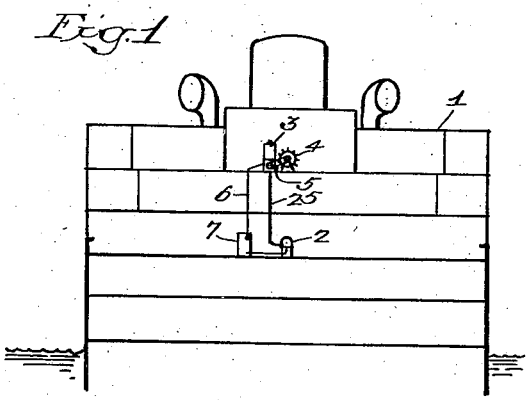
Inventor:
Britton Chance
by his Attorneys.
Howson & Howson

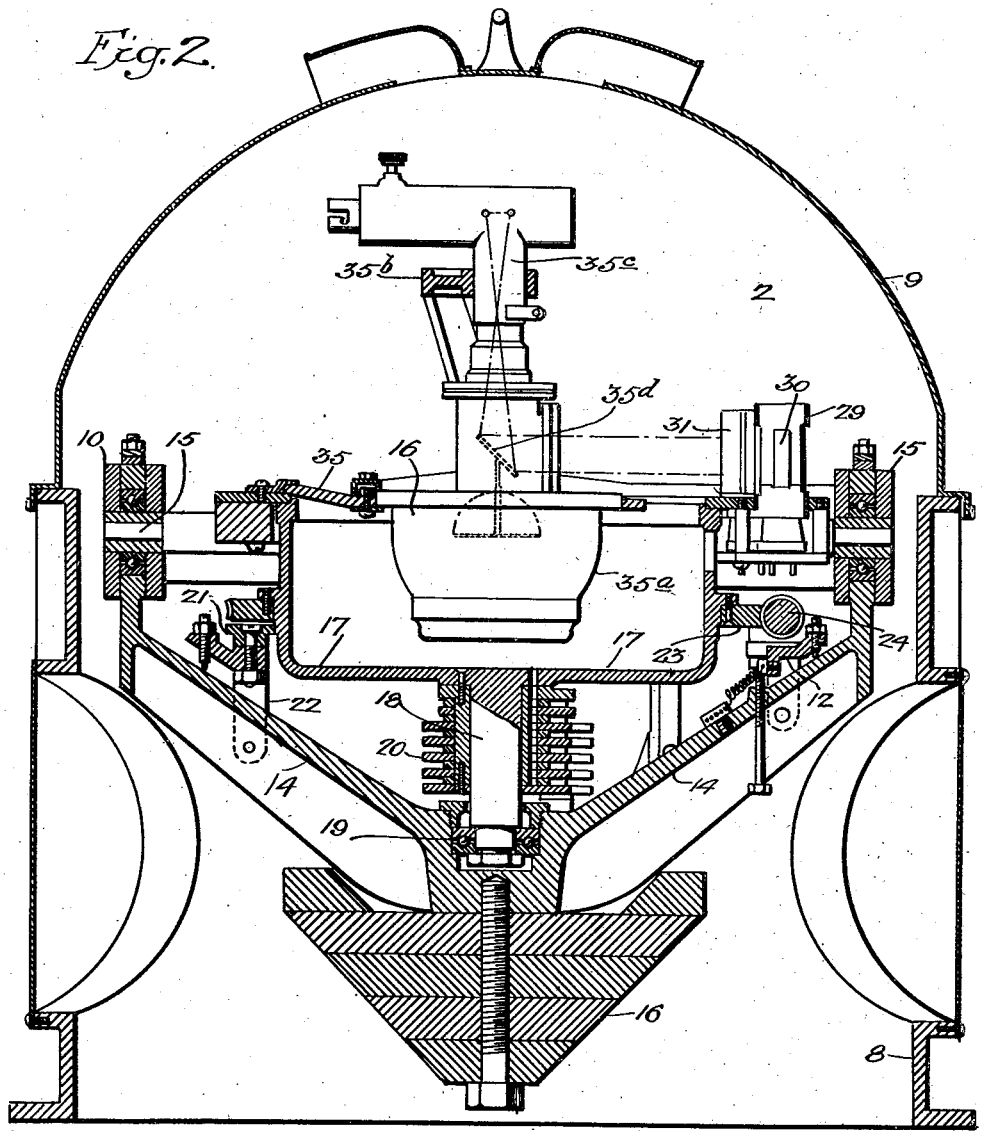

Dec. 26, 1939.   B. CHANCE   2,185,074
STEERING APPARATUS
Filed Oct. 8, 1937   11 Sheets-Sheet 3
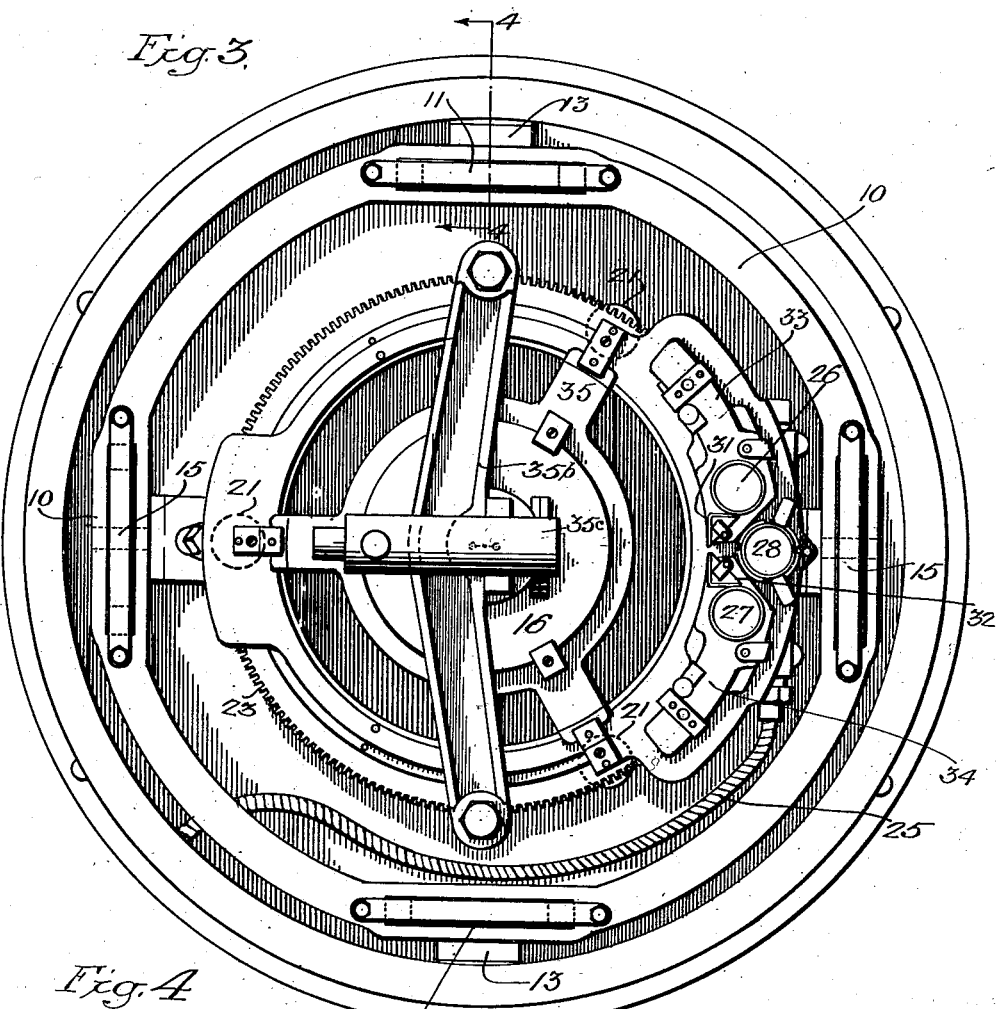
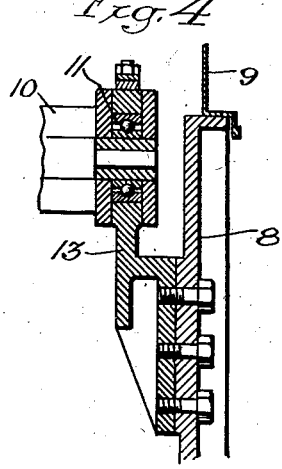
Inventor
Britton Chance
by his Attorneys
Howson & Howson Dec. 26, 1939.   B. CHANCE   2,185,074
STEERING APPARATUS
Filed Oct. 8, 1937    11 Sheets-Sheet 4

Inventor
Britton Chance
by his Attorneys.
Howson & Howson

Dec. 26, 1939.  B. CHANCE  2,185,074
STEERING APPARATUS
Filed Oct. 8, 1937   11 Sheets-Sheet 5
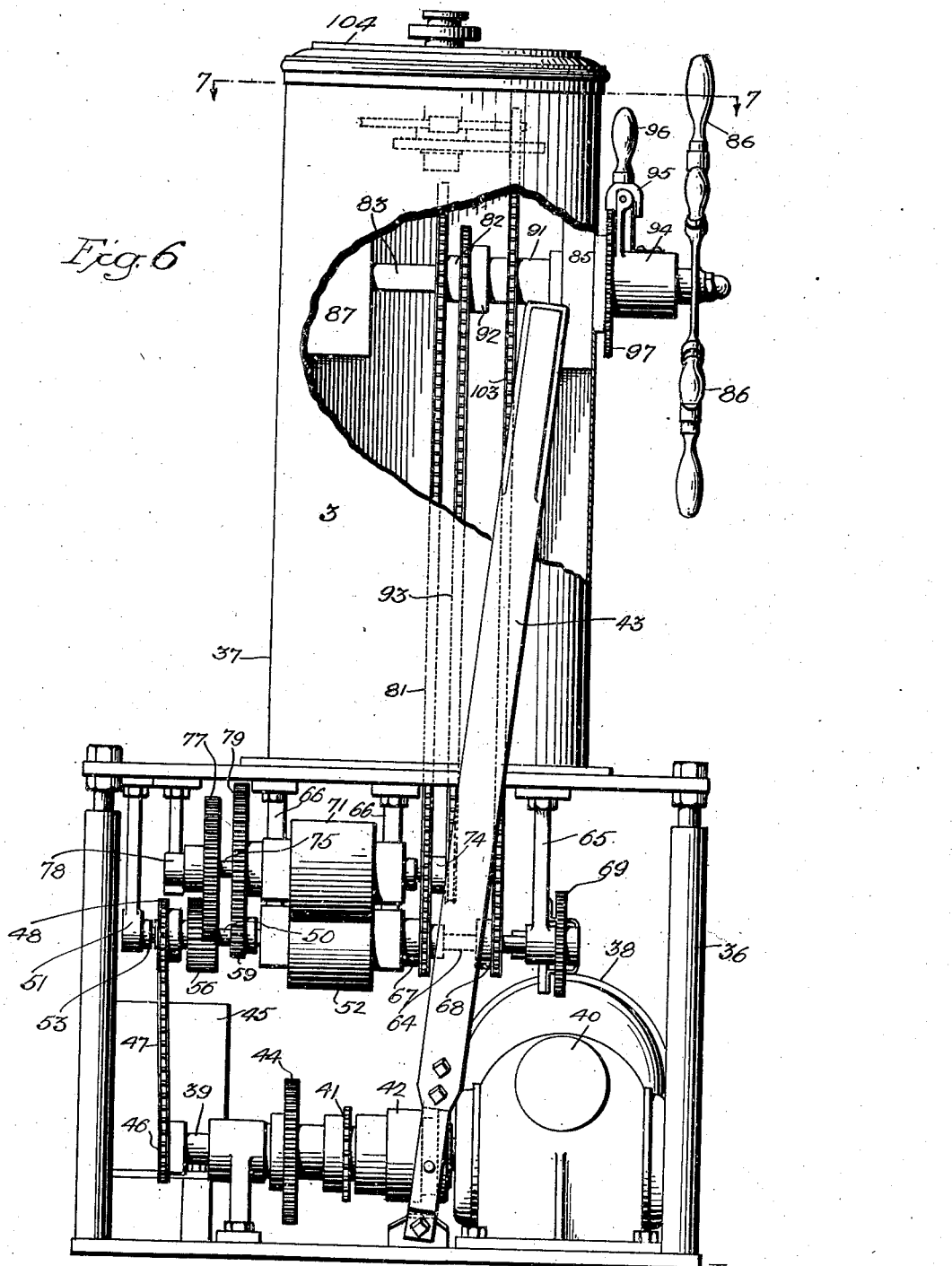

Dec. 26, 1939.   B. CHANCE   2,185,074
STEERING APPARATUS
Filed Oct. 8, 1937   11 Sheets-Sheet 6
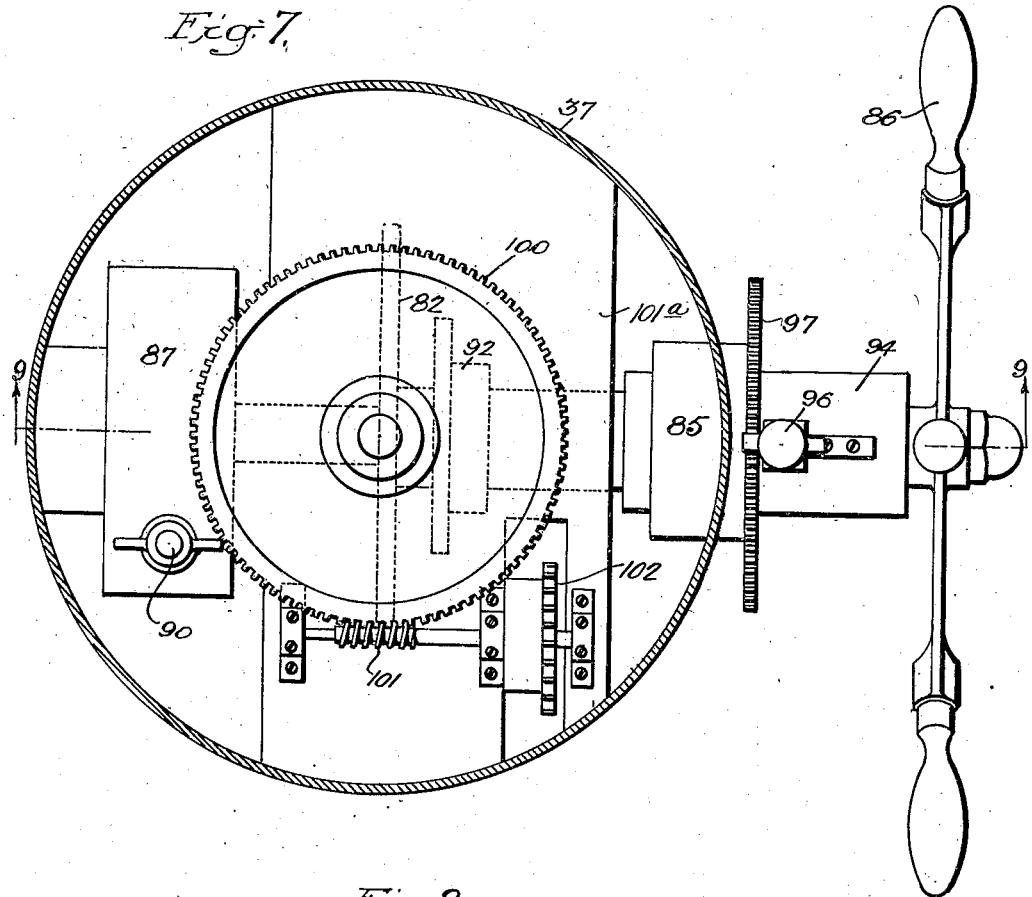
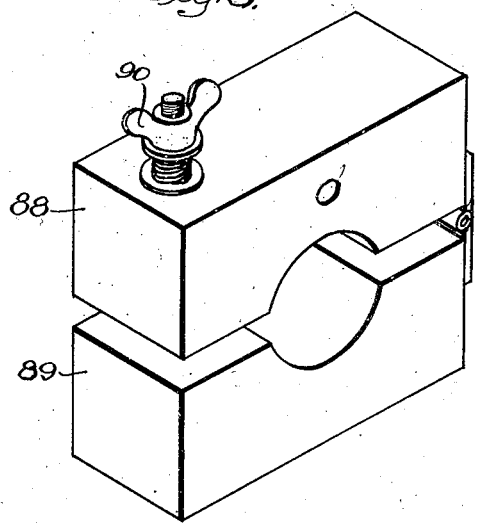
Inventor
Britton Chance
by his Attorneys.
Howson & Howson

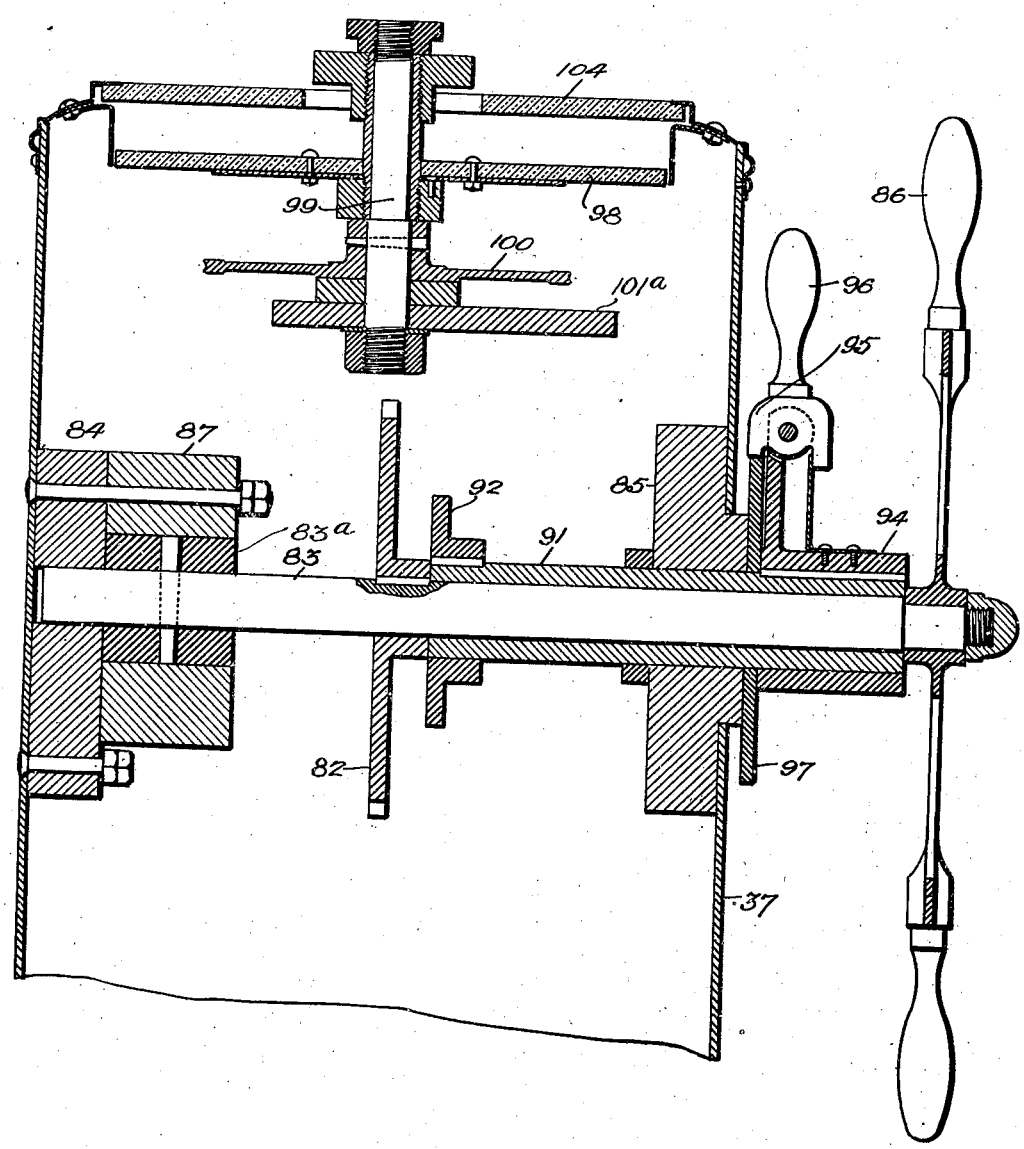

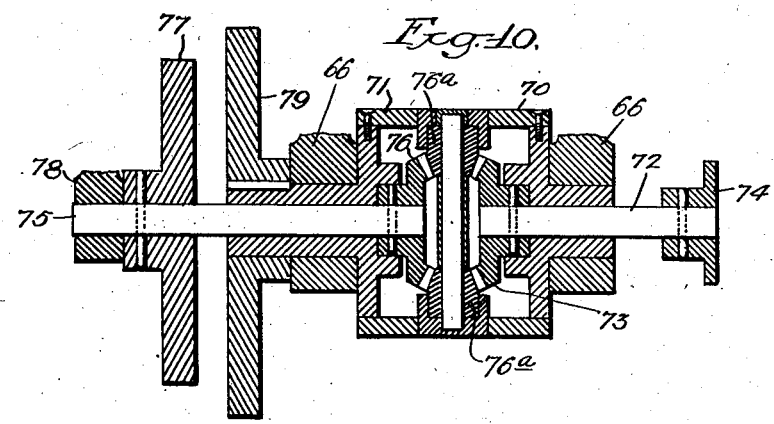
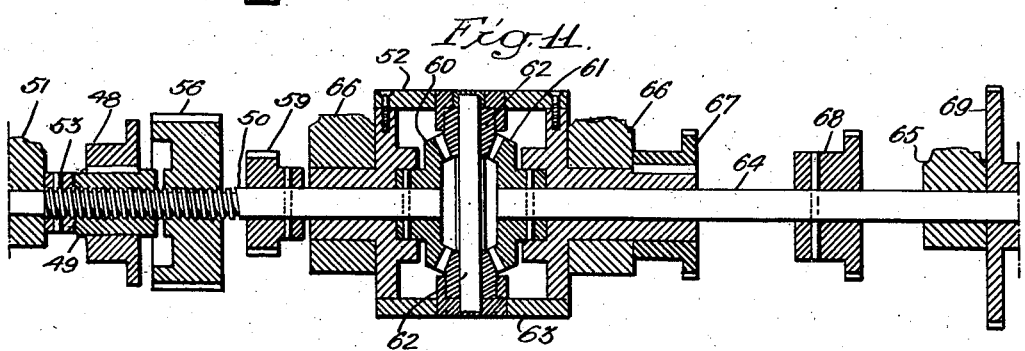
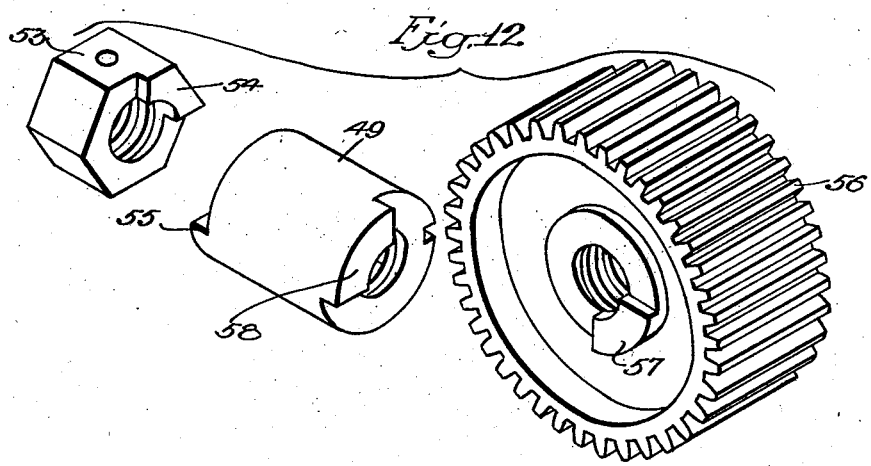

Dec. 26, 1939.   B. CHANCE   2,185,074
STEERING APPARATUS
Filed Oct. 8, 1937   11 Sheets-Sheet 9

Inventor:-
Britton Chance
by his Attorneys
Howson & Howson

Dec. 26, 1939. B. CHANCE 2,185,074
STEERING APPARATUS
Filed Oct. 8, 1937 11 Sheets-Sheet 10

Inventor:—
Britton Chance
by his Attorneys
Howson & Howson

Dec. 26, 1939.   B. CHANCE   2,185,074
STEERING APPARATUS
Filed Oct. 8, 1937    11 Sheets—Sheet 11

Inventor:—
Britton Chance
by his Attorneys
Howson & Howson

Patented Dec. 26, 1939

2,185,074

UNITED STATES PATENT OFFICE 2,185,074

STEERING APPARATUS

Britton Chance, Mantoloking, N. J.

Application October 8, 1937, Serial No. 168,081

21 Claims. (Cl. 114—144)

This invention relates to a novel automatic steering system for dirigible bodies or craft such as vessels, aeroplanes and the like.

One object of the invention is to provide a system of this class which comprises essentially a controlling unit or device adapted to be disposed in the tranquil zone of a craft, or in other words, at a position of least instability, and a controlled unit or device adapted to be disposed on the craft at any desired position remote from the controlling unit. The controlling unit responds to deviations of the craft from its course and controls the controlled unit accordingly, causing the latter to actuate the steering mechanism of the craft to bring the craft back on its course. Follow-back action is effected at the controlling unit by suitable means which preferably takes the form of a flexible rotary cable extending between the two units, this being the only mechanical connection between them. By virtue of the provision of the two units and their adaptability for disposition on the craft as above mentioned, the control action is caused to be in accurate response to deviations of the craft from its course and is unaffected by extraneous influence, such as rolling or other such motion of the craft. Moreover, the system enables positioning of the controlled unit at any desired position on the craft irrespective of the position of the controlling unit.

In addition to the ability to place the controlling unit in the tranquil zone of the ship, the invention enables the placing of that unit at the point in the ship where the earth's magnetic flux is least warped or damped by the ship's magnetism and is, therefore, at a maximum. The optimum position for locating the controlling device, therefore, must take into consideration both the tranquil zone and this position of maximum undistorted magnetic effect.

Another object of the invention is to provide a novel system of this character wherein the controlled unit embodies a course indicator. Accordingly, the controlled unit may be disposed on the craft at any desired position where it is desired to give a course indication. For example, this unit may be disposed at the position of manual control of the craft so that the pilot or helmsman may be apprised of the course of the craft during operation of the automatic steering system.

A further object of the invention is to provide means for changing the course of the craft manually at will using the follow-back connection between the units to control the controlling unit from the controlled unit.

A further object of the invention is to provide a system of the character above-mentioned wherein there is provided on the controlling unit means for adjusting the response of the said unit, and wherein there is provided on the controlled unit means for adjusting follow-back action. By means of these adjustments, the system is rendered flexible and it may be adapted at will to meet varying weather or climatic conditions and the sensitivity of the system may be varied.

Still another object of the invention is to provide novel means for preventing control action when the ship rolls or moves in any manner other than angularly in azimuth with respect to its course.

Other objects and features of the invention will appear hereinafter.

In the accompanying drawings:

Fig. 1 is a diagrammatic illustration of the manner in which the two units may be positioned on a craft such as a vessel;

Fig. 2 is a sectional elevational view of one form of the controlling unit;

Fig. 3 is a plan view of the same unit with the cover removed;

Fig. 4 is a sectional detail view taken along line 4—4 of Fig. 3;

Fig. 6 is an elevational view of the same unit looking at the unit from the left-hand side as viewed in Fig. 5, a portion of the casing being broken away for illustration of certain details;

Fig. 7 is a sectional plan view taken along line 7—7 of Fig. 6;

Fig. 8 is a perspective view of a frictional drag device employed in the controlled unit;

Fig. 9 is a fragmentary sectional elevation of the upper part of the controlled unit taken along line 9—9 of Fig. 7;

Fig. 10 is a sectional detail view of one of the differential mechanisms employed in the controlled unit;

Fig. 11 is a similar view of another differential drive mechanism embodying the follow-back adjustments;

Fig. 12 is an exploded view showing in perspective certain parts of the adjustable lost-motion mechanism employed in the drive of Fig. 11;

Fig. 13 is a phantom elevational view of the controlled unit illustrating the flexible drive connections thereof;

Fig. 14 is a diagrammatic illustration of a simple electrical circuit which may be employed in the system;

Figure 5:
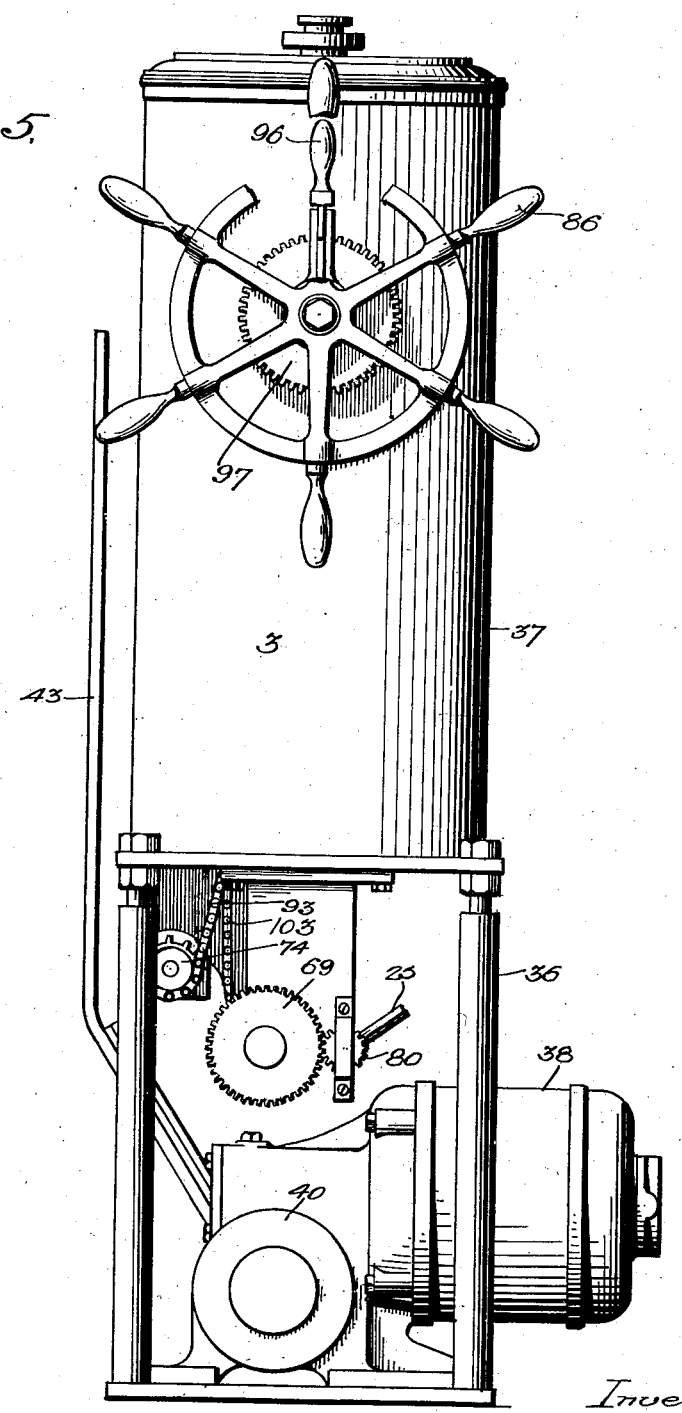
Fig. 5 is an elevational view of one form of the controlled unit.

Referring to Fig. 1, there is illustrated diagrammatically a vessel 1 which is representative of any dirigible body or craft on which the invention may be employed, it being understood that the invention is adapted for use on other types of craft such as aeroplanes and the like. The diagrammatic illustration of Fig. 1 represents the portion of a vessel above the water line and shows successive decks of the vessel. The controlling unit or device 2, provided in accordance with the invention, is disposed on one of the decks of the vessel. The controlling unit or device 2, provided in accordance with the invention, is disposed on one of the decks as shown in the tranquil zone of the vessel, or in other words, at a position of least instability, while the controlled unit or device 3 is disposed at a desired position remote from the controlling unit 2. In the specific illustration, the controlled unit 3 is mounted on the bridge of the vessel as it is likely that such positioning of the controlled unit will generally be desirable, in order that the helmsman may be apprised of the course of the craft and may vary the course manually and may adjust the follow-back action, as described hereinafter. The controlled unit 3 is mechanically connected to the usual steering mechanism 4 of the craft. As illustrated, this mechanical connection comprises a flexible chain 5 extending between sprockets on the unit 3 and the steering mechanism 4, respectively. The control of unit 3 by unit 2 is effected electrically by means of electrical connections diagrammatically shown at 6. Usually, there will be employed a control panel or switchboard upon which the electrical relays and other electrical devices may be mounted and, therefore, a control panel is shown at 7. It will be understood, however, that the electrical circuits may be arranged in any desired manner and the control panel 7 is merely for convenience of mounting the electrical devices employed and does not constitute an essential element of the invention. Follow-back action is effected by means of a mechanical connection 25 between the units 2 and 3, as will be described in detail later.

Referring now to Figs. 2 to 4, there is illustrated in detail one form of the controlling unit or device 2. This unit comprises a support or housing 8 which is adapted to be rigidly mounted upon the craft at a predetermined position in the tranquil zone of the craft, as above indicated. A removable cover 9 serves, together with the support or housing, to house the elements of the device. Within the housing thus provided, there is mounted a gimbal ring 10 which is attached to the support 8 by means of the opposed pin bearings or journals 11 (see Figs. 3 and 4). As shown more clearly in Fig. 4, the gimbal ring 10 is thus supported by brackets 13 which, in turn, are attached to the support 8.

As shown more clearly in Fig. 2, the gimbal ring 10 carries a suspended yoke 14 which is supported by means of diametrically opposed pin bearings or journals 15. The yoke 14 is weighted as shown at 16 to maintain it in position and to resist movement due to rolling or other such motion of the craft. A cup-shaped member 17 is rotatably supported by the yoke 14, and to this end the member 17 is provided with a centrally disposed downwardly extending stud or spindle 18 which is rotatably supported on the yoke 14 by means of the bearing structure 19. A slip-ring structure 20 is arranged cooperatively with the spindle 18 and serves to make electrical connection to the electrical elements carried by member 17, as mentioned hereinafter. The side wall of the cup-shaped member 17 is supported by the rollers 21 which are carried upon adjustable brackets 22 secured to the yoke 14. The wall of member 17 carries a worm-wheel 23 which meshes with a worm 24 rotatably carried by the adjustable bracket 12 which is supported by yoke 14. The worm 24 is driven by the flexible shaft 25 (see Fig. 3) which constitutes the mechanical connection between the controlling unit 2 and the controlled unit 3, as shown in Fig. 1. The purpose of this shaft will be explained more fully later.

The cup-shaped member 17 carries a plurality of light-sensitive devices, such as photoelectric cells, and preferably there are provided three such devices or cell units, as shown in Fig. 3, comprising side units 26 and 27 and a central unit 28. Each of the cell units preferably comprises a casing 29 and a photoelectric cell 30 therein, as shown in Fig. 2. In cooperative relation with the photocell units, there are provided a pair of triangular prisms 31 and 32 associated respectively with the cell units 26 and 27 (see Fig. 3). The cell unit 26 and its associated prism 31 are mounted upon a support 33 which is adjustably carried upon the upper rim or flange of the cup-shaped member 17, while the cell unit 27 and its associated prism 32 are likewise mounted upon an adjustable support 34. Thus, each of the side cell units with its associated prism may be adjusted relatively to the central unit 28 to vary the response of the light-sensitive mechanism, as described more fully hereinafter.

A spider 35 is also carried by the cup-shaped member 17 and serves to support the bowl of a magnetic compass 35a within the member 17. A bracket 35b, also carried by the cup-shaped member 17, serves to support a lamp housing 35c in such manner that a lamp within the lamp housing projects a light beam downward substantially in axial alignment with the axis of the compass card. A reflecting device or mirror 35d is carried by the compass card and is mounted in substantial alignment with the axis thereof, and this reflecting device is adapted to reflect the light beam toward the light-sensitive mechanism as indicated in Fig. 2. This arrangement provides a reflected beam of light which is fixed in space and which remains fixed regardless of change in direction of travel of the craft. In other words, since the compass card remains fixed in position and the reflector 35d is carried at the axis of the compass card and since the projected light beam is substantially in alignment with the axis of the compass card, rotation of the projected beam about its axis will not vary the position of the beam relative to the reflector 35d and the reflected beam will, therefore, remain in fixed position.

When the craft is on its course, the reflected beam is directed into the space between the prisms 31 and 32, as may be seen in Fig. 3, and the beam impinges upon the central light-sensitive device 28. When the craft deviates from its course in one direction or the other, however, the support 8 moves accordingly, carrying with it the structure above described including the cup-shaped member 17 and the light-sensitive mechanism. Thus, the light-sensitive cell assembly is moved toward one side or the other of the fixed reflected beam and, as a result, the beam impinges upon one or the other of the prisms 31 and 32 and is reflected by the prism onto the associated light-sensitive device 26 or 27. The side cell unit, which is thus activated in response to deviation of the craft from its course, effects control of the controlled unit or device 3 in a manner to bring the craft back on its course, as described in detail hereinafter. It will be seen that by adjusting the positions of the light-sensitive devices 26 and 27 and their associated prisms relative to the central light-sensitive device 28, the sensitivity or response of the controlling unit may be varied by providing a predetermined amount of time lag in the activation of the devices 26 and 27 by the light beam. In this manner, adjustment of the response of the controlling unit may be made to meet varying weather or climatic conditions.

The electro-optical device above described is generally similar to that disclosed and claimed in United States Patent No. 2,102,511, granted December 14, 1937, wherein there is provided a reflecting device and a light source mounted in cooperative relation with a compass card as above described, and there is also provided a group of three light-sensitive devices cooperatively arranged with the reflected light beam to function in the manner above described.

Referring now to Figs. 5 to 13, there is illustrated in detail one form of the controlled unit or device 3 which is controlled electrically by the controlling unit or device 2. As illustrated, the controlled unit may comprise a supporting framework 36 or the like adapted to support the driving mechanism and upon which there is mounted a housing 37 carrying a course indicator and manual controls, as will be presently described. The upper part of the unit, including the housing 37, may, therefore, be disposed at a desired position within easy access of the pilot or helmsman of the craft. In the case of a vessel, for example, the housing 37 may project upward from the floor of the bridge in the immediate vicinity of the manual steering control mechanism so that the helmsman may observe the course indication given by the course indicator and may also actuate the controls hereinafter described.

Referring particularly to Figs. 5 and 6, a reversible motor 38 serves to drive a shaft 39 through a speed-reduction mechanism 40. A sprocket 41 is loosely mounted upon the shaft 39 and is adapted for mechanical connection to the shaft through the clutch 42 which is operable by the hand lever 43. Thus, by actuating the clutch, the sprocket 41 may be engaged or disengaged with respect to shaft 39 at will. The sprocket 41 is connected by a flexible drive, such as a chain, to the manual steering mechanism of the craft. In Fig. 1, this driving connection is shown at 5, as above mentioned. Thus, by providing a sprocket on the shaft of the handwheel steering mechanism of the craft, and by connecting that sprocket with the sprocket 41 by means of a chain, the sprocket 41 may be caused to actuate the steering mechanism of the craft.

A gear 44 mounted upon shaft 39 meshes with gear 44a (see Fig. 13) and serves to drive a limit switch within the housing 45, which switch controls the limit of rotation of the motor 38 in either direction, as will be described in further detail later.

At the end of the shaft 39, there is provided a sprocket 46 connected by a chain 47 to a sprocket 48 carried upon an internally threaded hub 49 (see Fig. 11) mounted upon the threaded end of a shaft 50. One end of the shaft 50 is journaled in a support 51, while the other end of this shaft extends into the differential gear mechanism 52 to be described later. Adjacent the support 51, the shaft 50 carries a nut 53 which is secured to the shaft and turns therewith. The nut 53 has an extending lug 54 (see Fig. 12) which is adapted to cooperate with an extending lug 55 on the adjacent end of the hub 49. On the opposite side of the hub 49 there is provided an internally threaded gear 56 which is likewise carried upon the threaded portion of the shaft 50 and which has an extending lug 57 adapted to cooperate with the extending lug 58 on the adjacent end of hub 49.

It will be seen then that the nut 53 is fixed in position axially of the shaft 50, while the gear 56 is adjustable axially along the shaft. When the gear 56 is maintained in a certain adjusted position, it serves, together with the nut 53, to define the range of possible movement of hub 49 axially of the shaft 50. By virtue of this arrangement, an adjustable lost-motion connection is provided between the motor-driven shaft 39 and the shaft 50 for either direction of rotation of the shaft 39. In the position of the parts shown in Fig. 11, the hub 49 is interlocked with the nut 53 and if the shaft 39 were rotated in a certain direction, the shaft 50 would be driven through the interlocking members 53 and 49, but if the shaft 39 were driven in the opposite direction, the hub 49 would be moved by the sprocket 48 toward the right, as viewed in Fig. 11, until the hub 49 interlocked with the gear 56. Thus, in the latter instance, the shaft 50 would not be driven until the lost-motion were taken up. The purpose of this feature will be fully understood as the description proceeds.

The shaft 50 also carries a gear 59 and a bevel gear 60 forming a part of the differential gear device 52. The gear 60 is connected to the opposite bevel gear 61 through the gears 62 carried by the differential housing 63, as will be well understood. The gear 61 is carried at the end of a shaft 64 whose opposite end is journaled in the support 65. The differential housing 63 is mounted in journal sprockets 66, and to the hub of the housing there is secured a sprocket wheel 67. The shaft 64 carries a sprocket wheel 68 and a gear 69. As shown in Fig. 5, the gear 69 meshes with a small gear 80 which drives the flexible shaft 25, which shaft, in turn, drives the worm 24 of the controlling unit 2, as described above in connection with Figs. 2 to 4.

Adjacent the differential gear drive above described, there is provided a second differential gear drive as shown in Fig. 10. The journal supports 66 carry the housing 70 of the differential gear device 71. At one side of the differential gear mechanism, there is provided a shaft 72 carrying at one end the differential bevel gear 73 and at its other end the sprocket wheel 74. At the other side of the differential gear mechanism, there is provided a shaft 75 carrying at one end the bevel gear 76 and at its other end a gear 77 which meshes with the gear 56. The bevel gears 73 and 76 mesh with the gears 76a carried by the differential housing. The end of shaft 75 is journaled in the support 78. A gear 79 is carried upon the extending hub of the differential housing 70 and meshes with the gear 59.

As may be seen in Figs. 6, 9, and 13, the sprocket wheel 67 is connected by a chain 81 to a sprocket wheel 82 mounted upon a shaft 83 extending transversely of the housing 37 near the upper end thereof. The ends of the shaft 83 are rotatably mounted in the journal supports 84 and 85, respectively. One end of the shaft 83 projects through the housing 37, as shown in Fig. 9, and carries the hand wheel 86. A brake-like device 87, shown more clearly in Fig. 8, is carried by the journal support 84 and serves to impose a drag upon the shaft 83. This brake-like device comprises hinged parts 88 and 89 which are adjustable by means of the adjusting screw 90 to impose a desired amount of frictional drag upon a drum 83a carried by the shaft 83.

A sleeve 91 is rotatably mounted upon the shaft 83 and carries at one end a sprocket wheel 92 which is connected to the sprocket wheel 74 by means of a chain 93. The other end of the sleeve 91 projects through the housing 37 and carries a hub 94 upon which there is mounted a manually-operable pawl 95 having an operating handle 96. The pawl 95 is adapted to engage a stationary ratchet 97 carried by the support 85.

At the upper part of the housing 37, there is provided a course-indicating card 98 corresponding to the compass card. The card 98 is mounted upon a rotatable shaft 99 at the lower end of which there is provided a worm-wheel 100 which is actuatable by a worm 101 (see Fig. 7). The worm shaft, which is rotatably supported upon shelf 101a, carries a sprocket wheel 102 which is connected by chain 103 to the sprocket wheel 68. The shelf 101a also supports the lower part of shaft 99, as may be seen in Fig. 9. A transparent member 104 at the upper end of the housing 37 enables one to observe the course indication given by the indicator card 98.

The motor 38 is controlled by the light-sensitive units 26, 27, and 28 in response to deviation of the craft from its course and serves to effect the functioning of the controlled unit, as set forth hereinafter. In Fig. 14, there is illustrated a simple electrical circuit arrangement which may be employed to control the motor 38. The light-sensitive units 26 and 27 are connected respectively to relay windings 105 and 106 which are adapted, respectively, to actuate the pivoted armatures 107 and 108. The armatures, in turn, control the energization of motor 38. The central light-sensitive unit 28 is connected to relay windings 109 and 110 which also serve to actuate the armatures 107 and 108, respectively. When the reflected light beam impinges upon the central light-sensitive device, as will be the case when the craft is on its course, the windings 109 and 110 alone are energized and serve to maintain the pivoted armatures in the positions shown so that the motor 38 is deenergized. If the craft deviates from its course in such direction as to cause the reflected light beam to impinge upon the light-sensitive device 26, the winding 105 is selectively energized and causes the armature 107 to close a circuit for motor 38 as follows: From the supply conductor 111 through conductor 112, armature 107, conductor 113, the motor 38, conductor 114, armature 107, conductor 115, the closed limit switch contacts 116 to the other supply conductor 117. The motor 38 is thus caused to rotate in a direction to actuate the steering mechanism of the craft in a manner to bring the craft back on its course, as will be described presently, and, at the same time, the motor operates the limit switch cam 118 by means of gears 44 and 44a above mentioned. It will be understood that the limit switch merely serves to define the maximum possible range of actuation of the motor and normally the limit switch contacts will remain closed. By means of the follow-back action described hereinafter, the light beam is caused to again impinge on the central cell unit 28, thus deenergizing the motor 38.

If the craft deviates from its course in the opposite direction, the reflected light beam will impinge upon the light-sensitive device 27 and will cause selective energization of the winding 106. As a result, the pivoted armature 108 will be actuated to close a circuit for motor 38 as follows: From supply line 111 through conductor 119, armature 108, conductor 120, the motor 38, conductor 121, armature 108, conductor 122, the limit switch contacts 23 to the other supply conductor 117. It will be noted that in this instance the motor connections will be reversed with respect to the supply conductors so that the motor will operate in the opposite direction to bring the craft back on its course.

While a simple control circuit has been shown for the sake of simplicity, it will be understood that refinements may be included. For example, amplifiers may be provided to amplify the current output of the light-sensitive devices if necessary or desirable.

Considering now the operation of the above-described system as a whole, as long as the craft remains on its course, the central light-sensitive unit 28 will be energized and will maintain the motor 38 in deenergized condition, as above described. Should the craft deviate from its course in either direction, however, one or the other of the side light-sensitive units 26 and 27 will be energized and will cause energization of the motor 38 in the proper direction. Assuming that the clutch 42 is engaged, the motor 38 will drive the sprocket 41 which, in turn, will actuate the steering mechanism of the craft as above described in a direction to bring the craft back on its course. At the same time, the shaft 39, which is driven by the motor 38, will drive the sprocket 48, causing it to engage one or the other of the elements 53 and 56, depending upon the direction of rotation of the sprocket 48. If the direction of rotation is such as to cause the hub 49 to engage the nut 53, the shaft 50 will be directly driven and, since the housing of the differential gear device 52 is maintained stationary by the brake-like device 87, the shaft 50 will drive the shaft 64 which, in turn, will drive the flexible shaft 25 through the medium of gears 69 and 80. Rotation of the flexible shaft 25 causes the light-sensitive cell assembly to move relative to the light beam until the beam again impinges upon the central light-sensitive unit 28 and thus deenergizes the motor 38.

In the meantime, the shaft 64 will also drive the course-indicator card 98 through the medium of the chain drive 103 and the worm 101 and worm-wheel 100. Thus, the course indicator is caused to indicate the rudder movement which has been effected by the control action or the new course which the vessel would follow by virtue of the new rudder position were it not for the force which caused the craft to deviate from the desired course. If the craft continues to deviate from its course in the same direction, the above-described action will be repeated so that successive variations of the position of the craft's rudder will take place until sufficient rudder movement is effected to bring the craft back on the desired course.

Suppose now that the craft deviates from its course in the opposite direction, causing the sprocket 48 to move in the opposite direction until the hub 49 engages the gear 56. Since the shaft 72 is maintained stationary by the locked condition of the ratchet and pawl device 95, 97, the gear 56 will drive the shaft 50 through gear 77, shaft 75, the rotatable housing 70 of the differential gear device 71, gear 79 and gear 59. There is thus provided a driving connection from gear 56 to shaft 50 through the differential gear device 71, which prevents the gear 56 from rotating relative to shaft 50. Shaft 64 will then be driven by shaft 50 through the differential gear device 52 in the manner above described, thus effecting follow-back action through the medium of the flexible shaft 25 and also actuating the course indicator.

As above described, predetermined lost-motion is introduced between the shaft 39 and shaft 50 by virtue of the spaced elements 53 and 56 and the axially movable sprocket 48 therebetween. This provides a time lag in the operation of the follow-back mechanism and enables a desired amount of rudder actuation before the follow-back action becomes effective. This time lag may be varied by adjusting the position of the axially movable gear 56. Whenever it is desired to adjust the time lag, the ratchet device 95, 97 is released and the handle 96 is rotated in either direction to a new position and the ratchet device is again locked. The rotation of sleeve 91, which is thus effected, rotates the shaft 72 through the chain drive 93. Since the housing 70 of the differential gear device 71 is maintained stationary by the intermeshed gears 79 and 59, the shaft 72 rotates shaft 75 through the differential gear device 71, causing gear 77 to rotate gear 56 relative to shaft 50 and causing the gear 56 to move axially along shaft 50 in one direction or the other, depending upon the direction in which the handle 96 is rotated. In this manner, the gear 56 may be moved toward the left or right as viewed in Fig. 11, thus varying the axial range through which the sprocket 48 may move. It will be noted that the face of gear 56 is of sufficient width to permit it to move axially while still being intermeshed with gear 77. Thus, the time lag in the follow-back action may be varied at will to meet varying climatic or other conditions affecting the craft. This feature imparts greater flexibility to the system, enabling adjustment of the system to meet varying conditions.

If it is desired to change the course of the craft at any time, this may be accomplished by causing rotation of the flexible shaft 25 to move the light-sensitive devices relative to the light beam which, in turn, will cause operation of the steering mechanism in the manner above described. To thus vary the course of the craft at will, it is merely necessary to rotate the hand-wheel 86 in either direction depending upon the direction of the change desired. Rotation of the hand-wheel 86 causes rotation of the shaft 83 against the frictional drag imposed thereon by the device 87. The shaft 83, in turn, rotates the housing of the differential gear device 52 through the chain drive 81. The shaft 64 is thus driven by the rotating housing 63 and in turn rotates the flexible shaft 25 through the medium of gears 69 and 80. At the same time, the course indicator is actuated through the chain drive 103. Thus, the flexible shaft 25 is utilized to change the course of the craft at will, in addition to serving as a part of the drive for the follow-back action.

When the clutch 42 is disengaged, the motor 38 will, of course, be ineffective to actuate the steering mechanism of the craft and the automatic steering function of the system is thus interrupted. At such time, however, the motor 38 will continue to be actuated in accordance with the deviation of the craft from its course and will serve to actuate the course indicator and also to effect follow-back action of the light-sensitive devices. In other words, the system will then serve merely as an automatic course indicator.

Figure 15:
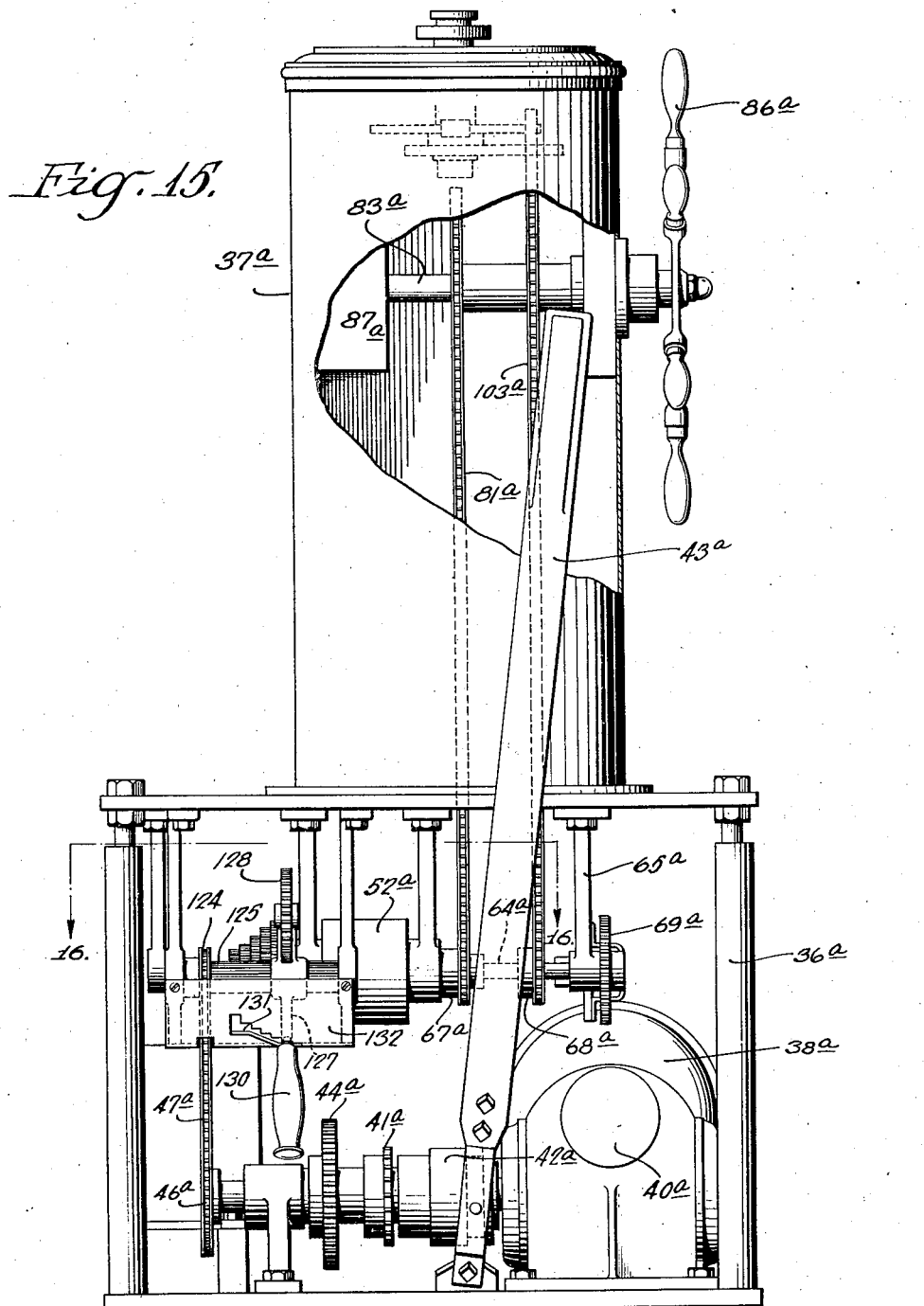
Fig. 15 is an elevational view of an alternative form of the controlled unit.
Figure 16:
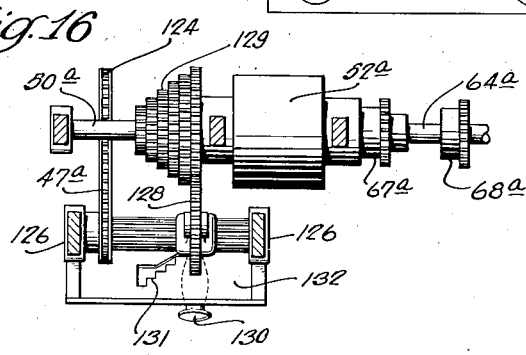
Fig. 16 is a fragmentary sectional view taken along line 16—16 of Fig. 15.
Figure 17:
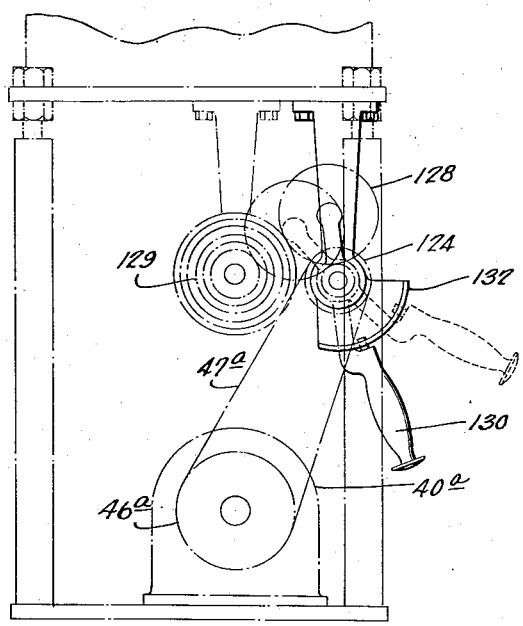
Fig. 17 is a phantom view illustrating further the speed change mechanism of the controlled unit.

In Figs. 15 to 17, there is illustrated a modified form of the controlled unit wherein the lost-motion or time lag device above described is replaced by a manually adjustable transmission so that the speed of the follow-back mechanism may be controlled to give varying amounts of rudder action for a given deviation of the craft from its course. In other words, instead of employing a time lag or lost-motion device to delay the follow-back action and thus control the amount of rudder action for a given deviation of the craft from its course, the modified form of the controlled unit illustrated in Figs. 15 to 17 employs an adjustable transmission device in the follow-up mechanism to vary the speed of the follow-up action and thus govern the amount of rudder action.

To a large extent, the modified form of the controlled unit embodies parts or elements corresponding both in structure and operation to parts or elements of the controlled unit above described, and these parts of the modified unit have been designated in correspondence with the corresponding parts of the controlled unit above described. It will be unnecessary, therefore, to describe these parts except as is necessary in the description of the modifications of the unit.

Referring particularly to Fig. 15, the sprocket 46a driven by the motor 38a in turn drives a sprocket 124 through chain 47a. The sprocket 124 is mounted upon a splined shaft 125 which is journaled in the stationary bearing supports 126. A gear carrier 127, which carries a gear 128, is pivotally mounted on the shaft 125 so that the gear 128, which meshes continually with the teeth of shaft 125, may be brought into mesh with any one of the gears 129 which are mounted upon the shaft 50a of the differential device 52a. It will be seen that by moving the gear carrier 127 pivotally about the shaft 125 and by sliding the gear carrier along the shaft, the gear 128 may be made to mesh with any one of the gears 129. To this end, the gear carrier is provided with an extending handle 130 which extends through an aperture 131 in a plate 132 carried by the bearing supports 126. As shown clearly in Figs. 15 and 16, the opening 131 is of step-like formation to provide successive recesses or notches corresponding to the respective gears 129. The purpose of this is to enable locking of the gear carrier 127 in any one of the successive positions to maintain the movable gear 128 in mesh with a desired one of the gears 129.

By means of this adjustable transmission device, the shaft 50a may be driven at different speeds to thus drive the shaft 64a through the differential device 52a. From the previous description, it will be apparent that the followback mechanism is thus operated at different speeds. Just as the adjustable lost-motion or time lag device of the first-described controlled unit may be varied to vary the effective rudder action, for example during different weather conditions, so also may the transmission device of the modified controlled unit be adjusted to vary the rudder action. Except for the elimination of the time lag or lost-motion device and its associated adjusting elements and the replacement thereof by the variable speed transmission device, the modified form of the controlled unit shown in Figs. 15 to 17 is similar in structure and operation to the previously described unit.

Figure 18:
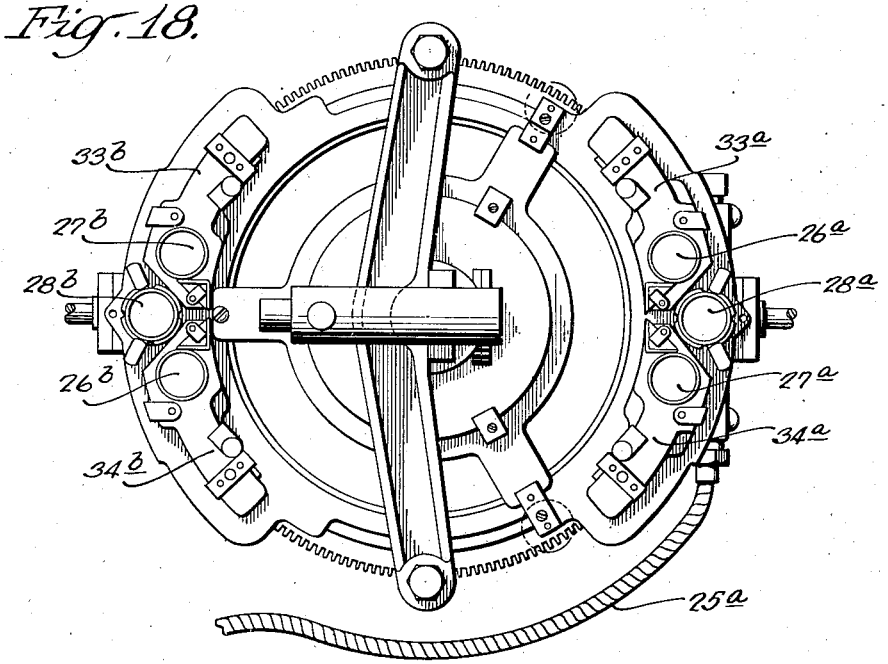
Fig. 18 is a plan view of an alternative form of the controlling unit.
Figure 20:
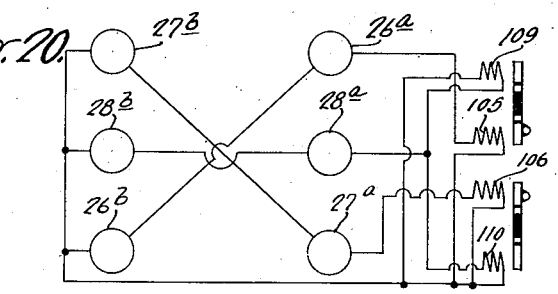
Fig. 20 is a diagrammatic illustration of the electrical circuit of the modified device.
Figure 19:
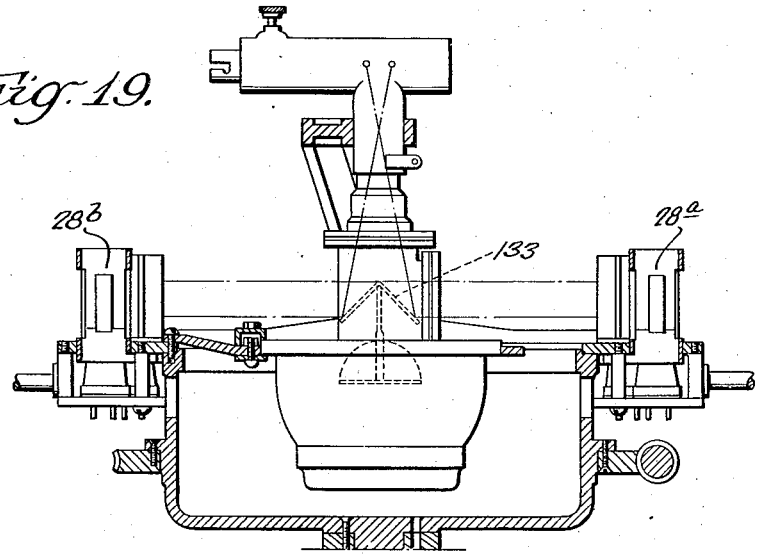
Fig. 19 is a sectional elevational view of the same.

In Figs. 18 to 20, there is illustrated a modified form of the controlling unit which eliminates any possibility of false operation of the system due to rolling or like motion of the craft. In the case of a vessel, for example, it is desirable, of course, that the steering system be operated only when the vessel moves angularly in azimuth with respect to the desired course. If rolling or other such motion of the vessel should cause the steering system to operate, it will obviously tend to drive the vessel off its course, which, of course, is objectionable. It will be seen from Figs. 2 and 3, as described above, that the support for the light-responsive devices may move pivotally on its pivotal mountings 15, whereas the light beam projected from the reflector 35d on the compass card remains fixed in position. In the case of a vessel in a rolling sea, the rolling motion of the ship may be sufficient to cause considerable swinging action of the light-sensitive devices and this may bring either one of the devices 26 and 27 into alignment with the light beam, thus causing undesired operation of the steering system as above described.

The modified form of the controlling unit shown in Figs. 18 and 19 eliminates the possibility of this abnormal action by providing two sets of light-responsive devices connected electrically in a particular manner. As shown clearly in Fig. 18, in this instance, there are provided light-responsive devices 26a, 27a and 28a corresponding to those of the previously described apparatus and, in addition, there are provided similar light-responsive devices 26b, 27b and 28b mounted in exactly the same manner diametrically opposite the first set of devices. As shown in Fig. 19, in this instance, there is provided a reflector 133 which serves to direct two beams in opposite directions toward the two sets of light-responsive devices. Normally, the two beams fall upon the central devices 28a and 28b. If the ship deviates from its course in one direction, the devices 26a and 26b are brought into alignment with the two beams, while if the ship deviates in the opposite direction, the devices 27a and 27b are brought into alignment with the two light beams.

As shown in Fig. 20, the light-responsive devices 28a and 28b are connected in series, the devices 26a and 26b are connected in series, and the devices 27a and 27b are also connected in series. The three series circuits are connected to control devices similar to those shown in Fig. 14, only the control relays being shown. The motor circuit may be arranged as in Fig. 14. The series-connected devices 26a and 26b are connected to relay winding 105; the series-connected devices 27a and 27b are connected to the relay winding 106; and the series-connected devices 28a and 28b are connected to the relay windings 109 and 110. It will be apparent that in order for any one of the three circuits to be energized, both of the series-connected devices of that circuit must be activated by the light beams. If the craft deviates in one direction, both of the devices 26a and 26b will be activated and their circuit will be energized. If the craft deviates in the opposite direction, the two devices 27a and 27b will be activated and their circuit will be energized. Suppose, however, that the craft rolls excessively and causes a horizontal shifting of the entire light device assembly, causing devices 26a and 27b for example to move into alignment with the light beams, obviously the activation of these devices will not cause energization of either of their circuits and, therefore, the steering system will not be operated. Likewise, if the devices 26b and 27a are moved into alignment with the beams, the steering system will not be operated. Thus, this device eliminates the possibility of false operation of the steering system due to rolling or other motion of the craft so that the steering system is operated only when the craft moves in azimuth with respect to its course.

It will be apparent from the above description that the invention provides a flexible system embodying remote control of a controlled unit from a controlling unit and enabling the controlling unit to be disposed at a position on the craft where it will be subjected to minimum effect of rolling of the craft or other extraneous influences. The system thus provides for accurate control in accordance with the deviation of the craft from its course. Moreover, the system provides for adjustment of the response thereof and adjustment of the follow-back action, thus enabling it to be adapted to varying conditions, and it also provides for remote control of the controlling unit by the controlled unit to enable manual variation of the craft's course at will. It will be noted also that the system is simplified by the provision of only two compact units which makes it highly practical and well adapted for the purposes in view.

It will be understood, of course, that the invention is not limited to the specific embodiments herein disclosed but is capable of various modifications, particularly in details thereof without departing from the spirit and scope of the invention.

I claim:

1. In an automatic steering system for a dirigible craft having a steering mechanism, a controlling unit disposed on said craft at a tranquil position thereof and comprising means for providing a fixed light beam and a plurality of light-sensitive devices movable with respect to said beam in response to deviation of the craft from its course, means for adjusting said devices relative to one another to vary the response of said controlling unit, a controlled unit disposed on said craft at a position remote from said controlling unit and comprising means controlled by said devices for actuating said steering mechanism in accordance with the craft's deviation, and means operable by said actuating means for effecting follow-back movement of said devices relative to said beam.

2. In an automatic steering system for a dirigible craft having a steering mechanism, a controlling unit disposed on said craft at a tranquil position thereof and comprising means responsive to deviation of the craft from its course, a controlled unit disposed on said craft at a position remote from said controlling unit and comprising means controlled by said first means for actuating said steering mechanism in accordance with the craft's deviation, means operable by said actuating means for effecting follow-back action of said first means, and manually adjustable means on said controlled unit for introducing a variable time lag in the follow-back action.

3. In an automatic steering system for a dirigible craft having a steering mechanism, a controlling unit disposed on said craft at a tranquil position thereof and comprising means responsive to deviation of the craft from its course, a controlled unit disposed on said craft at the steering position thereof and comprising means controlled by said first means for actuating said steering mechanism in accordance with the craft's deviation, means on said controlled unit operable by said actuating means for indicating the craft's course, means operable by said actuating means for effecting follow-back action of said first means, and means on said controlled unit operable at will for rendering said actuating means incapable of actuating said steering mechanism.

4. In an automatic steering system for a dirigible craft having a steering mechanism, a controlling unit disposed on said craft at a tranquil position thereof and comprising means responsive to deviation of the craft from its course, a controlled unit disposed on said craft at a position remote from said controlling unit and comprising means controlled by said first means for actuating said steering mechanism in accordance with the craft's deviation, means including a mechanical connection between said units operable by said actuating means for effecting follow-back action of said first means, and manually adjustable means on said controlled unit for introducing a variable time lag in the operation of said mechanical connection.

5. In an automatic steering system for a dirigible craft having a steering mechanism, a controlling unit disposed on said craft at a tranquil position thereof and comprising means responsive to deviation of the craft from its course, a controlled unit disposed on said craft at a position remote from said controlling unit and comprising means controlled by said first means for actuating said steering mechanism in accordance with the craft's deviation, means including a flexible mechanical connection between said units operable by said actuating means for effecting follow-back action of said first means, manually adjustable means on said controlled unit for introducing a variable time lag in the operation of said mechanical connection, and manually operable means on said controlled unit for actuating said mechanical connection to change the craft's course at will.

6. In an automatic steering system for a dirigible craft having a steering mechanism, means responsive to deviation of the craft from its course, means controlled by said first means for actuating said steering mechanism to bring the craft back on its course, a rotatable shaft, a power transmission element movable axially of said shaft, power transmission means connecting said actuating means to said element, a pair of spaced elements on said shaft defining the range of axial movement of said first element, cooperative clutch means on said elements for effecting a driving connection between said first element and one of said spaced elements when said first element is actuated, and means operable by said shaft for effecting follow-back action of said first means.

7. In an automatic steering system for a dirigible craft having a steering mechanism, means responsive to deviation of the craft from its course, means controlled by said first means for actuating said steering mechanism to bring the craft back on its course, a rotatable shaft having a threaded portion, a power transmission element threadedly mounted on said shaft portion, power transmission means connecting said actuating means to said element, a pair of spaced elements on said shaft defining the range of axial movement of said first element, cooperative clutch means on said elements for effecting a driving connection between said first element and one of said spaced elements when said first element is actuated, and means operable by said shaft for effecting follow-back action of said first means.

8. In an automatic steering system for a dirigible craft having a steering mechanism, means responsive to deviation of the craft from its course, a rotatable shaft having a threaded portion, a power transmission element threadedly mounted on said shaft portion, power transmission means connecting said actuating means to said element, a pair of spaced elements on said shaft defining the range of axial movement of said first element, one of said spaced elements being threadedly mounted on said shaft portion for axial movement therealong, manually operable means for adjusting said one element axially of the shaft to provide a desired spacing of said pair of elements, cooperative clutch means on said elements for effecting a driving connection between said first element and one of said spaced elements when said first element is actuated, and means operable by said shaft for effecting follow-back action of said first means.

9. In an automatic steering system for a dirigible craft having a steering mechanism, means responsive to deviation of the craft from its course, means controlled by said first means for actuating said steering mechanism to bring the craft back on its course, a rotatable shaft having a threaded portion, a power transmission element threadedly mounted on said shaft portion, power transmission means connecting said actuating means to said element, a pair of spaced elements on said shaft defining the range of axial movement of said first element, one of said spaced elements being threadedly mounted on said shaft portion for axial movement therealong, manually operable means including a differential gear device for adjusting said one element axially of the shaft to provide a desired spacing of said pair of elements, cooperative clutch means on said elements for effecting a driving connection between said first element and one of said spaced elements when said first element is actuated, and means operable by said shaft for effecting follow-back action of said first means.

10. In an automatic steering system for a dirigible craft having a steering mechanism, means responsive to deviation of the craft from its course, means controlled by said first means for actuating said steering mechanism to bring the craft back on its course, a rotatable shaft having a threaded portion, a power transmission element threadedly mounted on said shaft portion, power transmission means connecting said actuating means to said element, a pair of spaced elements on said shaft defining the range of axial movement of said first element, one of said spaced elements being threadedly mounted on said shaft portion for axial movement therealong, a differential gear device forming a driving connection between said one element and said shaft while permitting axial adjustment of said element, manually adjustable means operable through said differential gear device for adjusting said one element axially of the shaft to provide a desired spacing of said pair of elements, cooperative clutch means on said elements for effecting a driving connection between said first element and one of said spaced elements when said first element is actuated, and means operable by said shaft for effecting follow-back action of said first means.

11. In an automatic steering system for a dirigible craft having a steering mechanism, means responsive to deviation of the craft from its course, means controlled by said first means for actuating said steering mechanism to bring the craft back on its course, a rotatable shaft having a threaded portion, a power transmission element threadedly mounted on said shaft portion, power transmission means connecting said actuating means to said element, a pair of spaced elements on said shaft defining the range of axial movement of said first element, one of said spaced elements being threadedly mounted on said shaft portion for axial movement therealong, a differential gear device forming a driving connection between said one element and said shaft while permitting axial adjustment of said element, manually adjustable means operable through said differential gear device for adjusting said one element axially of the shaft to provide a desired spacing of said pair of elements, cooperative clutch means on said elements for effecting a driving connection between said first element and one of said spaced elements when said first element is actuated, a second rotatable shaft, a driving connection including a second differential gear device between said first shaft and said second shaft, means operable by said second shaft for effecting follow-back action of said first means, means operable by said second shaft for indicating the craft's course, and manually operable means including said second differential gear device for actuating said second shaft independently of said first shaft to change the craft's course at will.

12. In an automatic steering system for a dirigible craft having a steering mechanism, a controlling unit disposed on said craft at a tranquil position thereof and comprising means responsive to deviation of the craft from its course, a controlled unit disposed on said craft at a position remote from said controlling unit and comprising means controlled by said first means for actuating said steering mechanism in accordance with the craft's deviation, means operable by said actuating means for effecting follow-back action of said first means, and manually adjustable means on said controlled unit for varying the rate of the follow-back action to vary the amount of actuation of said steering mechanism for a given deviation of the craft from its course.

13. In an automatic steering system for a dirigible craft having a steering mechanism, a controlling unit disposed on said craft at a tranquil position thereof and comprising means responsive to deviation of the craft from its course, a controlled unit disposed on said craft at a position remote from said controlling unit and comprising means controlled by said first means for actuating said steering mechanism in accordance with the craft's deviation, means operable by said actuating means for effecting follow-back action of said first means, and a manually adjustable transmission device on said controlled unit for varying the rate of the follow-back action to vary the amount of actuation of said steering mechanism for a given deviation of the craft from its course.

14. In an automatic steering system for a dirigible craft having a steering mechanism, means for providing a pair of beams of radiant energy, beam-responsive means normally activated by said beams, a pair of spaced serially-connected beam-responsive devices normally out of line with said beams and adapted to be brought into line with the beams when the craft deviates in one direction from its course a predetermined amount, a second pair of spaced serially-connected beam-responsive devices normally out of line with said beams and adapted to be brought into line with the beams when the craft deviates in the opposite direction from its course a predetermined amount, means controlled by said devices for actuating said steering mechanism, means controlled by said first-mentioned beam-responsive means for maintaining said actuating means inoperative as long as said craft remains on its course, and follow-back means operable by said actuating means for returning said devices to normal position.

15. In an automatic steering system for a dirigible craft having a steering mechanism, means for providing a pair of beams of radiant energy, a pair of spaced serially-connected beam-responsive devices normally in line with said beams and adapted to be moved out of line with the beams when the craft deviates from its course, a second pair of spaced serially-connected beam-responsive devices normally out of line with said beams and adapted to be brought into line with the beams when the craft deviates in one direction from its course a predetermined amount, a third pair of spaced serially-connected beam-responsive devices normally out of line with said beams and adapted to be brought into line with the beams when the craft deviates in the opposite direction from its course a predetermined amount, means controlled by said second and third pairs of devices for actuating said steering mechanism, means controlled by said first pair of devices for maintaining said actuating means inoperative as long as said craft remains on its course, and follow-back means operable by said actuating means for returning said devices to normal position.

16. In an automatic steering system for a dirigible craft having a steering mechanism, a source of two fixed beams of radiant energy directed horizontally in diametrically opposite directions from a central point, a horizontal support arranged for rotation in either direction about said point in response to deviations of the craft in azimuth from its course in either direction, a pair of spaced serially-connected beam-responsive devices disposed on said support on a horizontal diametrical axis passing through said point and normally out of line with said beams, a second pair of spaced serially-connected beam-responsive devices disposed on said support on another horizontal diametrical axis passing through said point and normally out of line with said beams, whereby the rotation of said support brings one or the other pair of devices into coincidence with said beams and the beams activate both devices of the pair, the said devices being non-responsive to any movement of the craft causing the beams to impinge on the devices in any other manner, means controllable by either pair of serially-connected devices for actuating said steering mechanism, and follow-back means operable by said actuating means for restoring the normal relation between said beams and said devices.

17. Direction indicating apparatus for dirigible craft, comprising means at a relatively tranquil position on said craft for detecting directional deviations of the craft, said means comprising a light beam and a plurality of light-responsive devices arranged cooperatively with said beam, a direction indicator at another position on said craft, a motor arranged to actuate said indicator, means controlled by certain of said devices for energizing said motor whenever a directional deviation of the craft takes place exceeding in amount a predetermined minimum, follow-up means for restoring the normal relation of said devices to said beam, and means controlled by another of said light-responsive devices, for maintaining said motor at standstill when the said normal relation obtains and when the directional deviation of the craft is less than the said predetermined minimum.

18. Direction indicating apparatus for dirigible craft, comprising means at a relatively tranquil position on said craft for detecting directional deviations of the craft, said means comprising a directionally fixed light beam and at least three light-responsive devices arranged cooperatively with said beam, a direction indicator at another position on said craft, a motor arranged to actuate said indicator, means controlled by one of said devices for energizing said motor in one direction in response to a deviation of the craft greater than a predetermined minimum in a given direction, means controlled by another of said devices for energizing said motor in the other direction in response to a deviation of the craft greater than the predetermined minimum in the other direction, follow-up means for restoring the normal relation of said devices to said beam, and means controlled by a third light responsive device for maintaining said motor at standstill when said normal relation obtains and the directional deviation of the craft is less than the said predetermined minimum.

19. In a steering system for a dirigible craft having a steering mechanism, means at a relatively tranquil position on said craft for detecting directional deviations of the craft, said means comprising a directionally fixed light beam and a light-sensitive cell assembly movable relative to said beam, a motor for actuating said steering mechanism, means controlled by the light-sensitive cells for energizing said motor whenever a directional deviation of the craft takes place, a follow-up connection to said cell assembly actuated by said motor, a direction indicator at another position on said craft actuated by said motor, and manual means at said other position for actuating said connection and said indicator at will, to thereby move said cell assembly and change the direction of the craft according to the reading of said indicator.

20. In a steering system for a dirigible craft having a steering mechanism, means at a relatively tranquil position on said craft for detecting directional deviations of the craft, said means comprising a directionally fixed light beam and a light-sensitive cell assembly movable relative to said beam, a motor for actuating said steering mechanism, means controlled by the light-sensitive cells for energizing said motor whenever a directional deviation of the craft takes place, a driven member actuated by said motor, a direction indicator at a position remote from said first-mentioned position actuated by said driven member to thereby indicate the course of the craft, follow-up means between said driven member and said cell assembly, and manual means at said remote position for actuating said driven member at will, to thereby move said cell assembly and change the direction of the craft according to the reading of said indicator.

21. In a steering system for a dirigible craft having a steering mechanism, means at a relatively tranquil position on said craft for detecting directional deviations of the craft, said means comprising a directionally fixed light beam and a light-sensitive cell assembly movable relative to said beam, a motor for actuating said steering mechanism, means controlled by the light-sensitive cells for energizing said motor whenever a directional deviation of the craft takes place, a differential gear device connected to said motor, a driven member connected to said device so as to be actuated by said motor, a direction indicator at a position remote from said first-mentioned position actuated by said driven member to thereby indicate the course of the craft, follow-up means between said driven member and said cell assembly, and manual means at said remote position for actuating said driven member at will, to thereby move said cell assembly and change the direction of the craft according to the reading of said indicator.

BRITTON CHANCE.